Jan. 3, 1967  R. A. OSWALD  3,295,427
FILM MAGAZINE
Filed Nov. 13, 1963
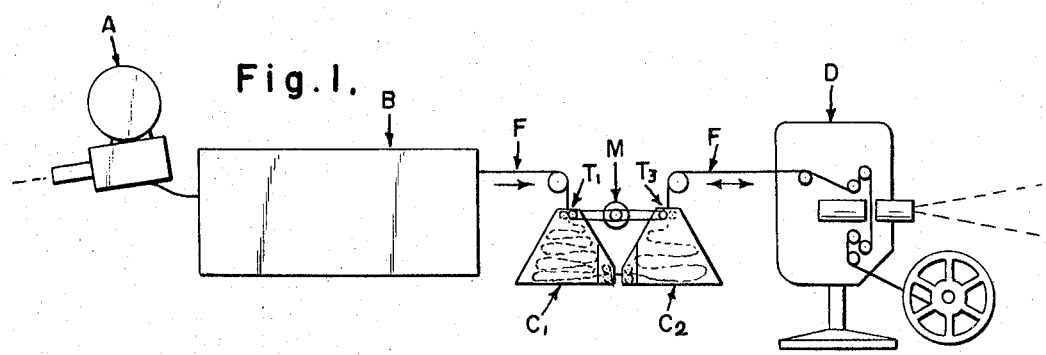
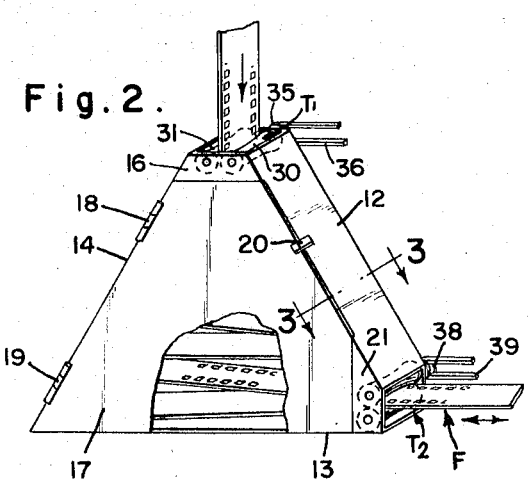
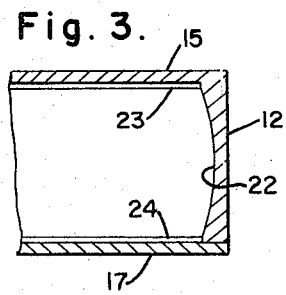
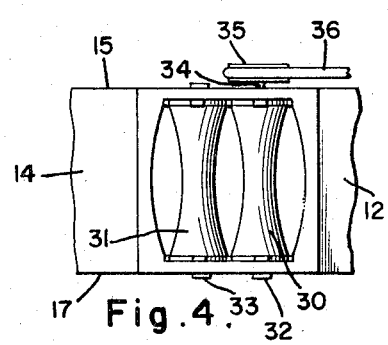
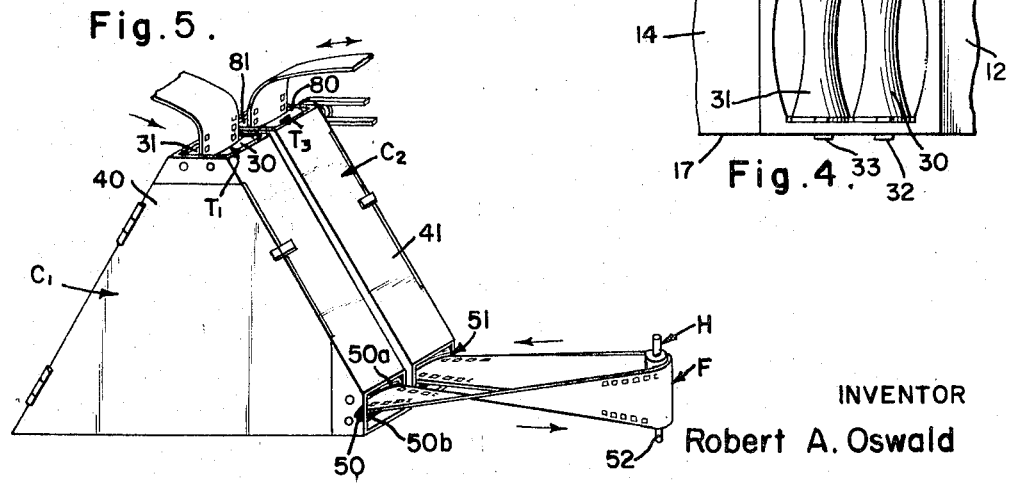
INVENTOR
Robert A. Oswald
BY Townsend and Townsend
attorneys United States Patent Office 3,295,427
Patented Jan. 3, 1967

3,295,427
FILM MAGAZINE
Robert A. Oswald, 5701 W. Adam Blvd.,
Los Angeles, Calif. 90016
Filed Nov. 13, 1963, Ser. No. 323,302
11 Claims. (Cl. 95—12)

This invention relates to an improved film storage magazine for a continuous strip of film.

For policing horse races, it is desirable to provide a photographic system which will take a motion picture of the entire race, develop the film and view the developed film all in a continuous-run process. If a conventional film reel were to be used for storing the film between the processing step and the viewing step, it would be necessary to first wind the film onto the conventional reel as it leaves the developer. Then the film would have to be cut at the end of the race. Since the film would be wound backward on the first reel, it would be necessary to rewind the film onto a second reel. With the film on the second reel it would then be ready for viewing. These extra steps thus result in a substantial time delay when time is of essence.

This invention provides a film magazine for storing large amounts of film between the steps of developing motion picture film and viewing it in which there is no need to cut the film or rewind it prior to subsequent viewing. By forming the film storage magazine in a generally triangular configuration, it has been found that large amounts of film can be stored within it without jamming or snarling.

An advantage resides in the fact that relatively even and constant feed or withdrawal of strip film into or from the magazine can be obtained at passageways positioned at the triangle corners without snagging or snarling of the film.

Another object of this invention is to provide a film storage magazine which includes a housing having two diverging downwardly extending side walls, each arranged to form part of a film storage chamber. A film input passageway is provided at the apex of the diverging side walls and as film is fed through the input passageway and into the chamber, the diverging side walls operate to fold the film into a configuration for high density storage.

Another object of this invention is to provide a film magazine with side walls having an outward curvature which prevents the soft picture portion of the film from contacting the side wall to thus substantially eliminate wearing and scratching of the film surface.

It is another object of this invention to provide a film storage magazine of the above type which includes two constant torque drive means each of which is positioned at a magazine corner to feed the strip film through corner passageways into the magazine at a constant torque. This torque is low enough to be overcome by the projector sprocket drive force and permit the film to be pulled out of the magazine against this constant torque force when viewing is desired.

Other objects and advantages of the present invention will become apparent upon reading the following specification and referring to the accompanying drawings in which:

FIG. 1 is a schematic illustration of a system in which this invention can be used;

FIG. 2 is a perspective view of a single magazine embodiment of this invention;

FIG. 3 is a fragmentary cross-sectional view of the outward curved magazine side wall as taken along the line 3—3 of FIG. 2;

FIG. 4 is an enlarged fragmentary top view of the magazine of FIG. 2; and

FIG. 5 is a perspective view of a double magazine embodiment of this invention.

As illustrated generally in FIG. 1, one system with which this invention for a film magazine could be used would include a motion picture camera A which is positioned to view an event such as a horse race. As the film is exposed, it is transferred immediately to a film processor B which develops, prints and dries the film in a continuous, sequential operation.

When sufficiently dry film F is transferred from the processing machine B over a roller or other transfer means into the film storage magazine $C_1$ by means of the torque means $T_1$ located at the apex of magazine $C_1$. Once inside film magazine $C_1$, film F folds into a configuration which allows high density storage.

When a second film magazine, such as $C_2$ is used, the continuous strip of film F is transferred from the first magazine $C_1$ to the second storage magazine $C_2$ at the adjacent lower corners. Films F then continues out through the apex of magazine $C_2$ and to film projector or viewer D where it is threaded through a sprocket drive means and wound onto a conventional film take-up reel. A constant torque drive means $T_3$ is provided at the apex of second magazine $C_2$ which provides a tensioning force having a tendency to pull the film back within the can or film magazine. In determining the torque force, it can be seen that the inward directed force of constant torque means $T_3$ should be low enough to permit the conventional sprocket drive of the film viewer to pull the strip film F from the storage magazine $C_2$ when viewing is desired and high enough to pull film F back down into the film magazine when the sprocket drive on projector D is reversed. Thus it can be seen that while the film is outside the cannisters or film storage magazine $C_1$ and $C_2$, it is held under some tensional force by the two constant torque drive means $T_1$ and $T_3$.

As illustrated in FIGS. 2 to 4, the generally triangular film magazine C includes a plurality of side walls 12, 13 and 14 which are positioned between a triangular back plate 15 and front face 17. Each side wall, 12, 13 or 14, is in the form of a rectangular strip and is secured along one lengthwise edge to the triangular back plate 15 by welding or other conventional means. Inclined side wall 14 is also secured along its lower short edge to the bottom side wall 13. The other inclined side wall 12 does not meet either of side walls 12 or 13 thus forming a passageway at the magazine apex and one lower corner.

The generally triangular front face is formed in three pieces including a hinged door 17. The upper segmented piece 16 at the magazine apex is welded to slanting side walls 12 and 14 and is formed with two spaced apart mounting holes for receiving the rollers of constant torque device $T_1$. The lower segmented piece 21 is similarly secured between slanting side wall 12 and bottom side wall 13 and is also formed with two mounting holes for the rollers of constant torque device $T_2$. The hinged access door 17 is secured along the left-hand edge to side wall 14 by two hinges 18 and 19. The opposite edge includes a catch of latch 20 for holding the door in the closed position.

Since the material used in constructing the magazine is relatively thin, the chamber formed within the walls has the same general triangular shape as the exterior walls. It is only necessary that the inside width or thickness between the front face and back wall be slightly greater than the width of film which is to be received and stored.

As film F is fed into the inner chamber and is bent and folded for high density storage it will tend to rub and slide against the inner surface of side walls 12, 13 and 14. In order to prevent wear and scratching of the central picture portion of the film each of the side walls 12, 13 and 14 is concave at 22 so that only the film edges will contact the thin, flat bands 23 and 24. This also offers low frictional resistance and allows film F to be slidably transferred within the chamber with minimal friction forces developing along the side wall In order to provide a positive feed of film F into the chamber of film magazine C, a constant torque friction drive means $T_1$ is provided at the truncated apex portion of the magazine. As illustrated in FIGS. 2 and 4, constant torque means $T_1$ includes a pair of spaced, parallel, rotating film rollers 30 and 31 which are mounted on axles 32 and 33 respectively. In order to prevent axle 33, which is the shorter of the two axles, from axially sliding within the mounting holes provided in back plate 15 and front segment 16, each end is flattened to form a head portion which is larger than the mounting holes. The power axle 32, which is the longer of the two axles, also has the front end flattened and a stop plate 34 secured adjacent back plate 15 to prevent removal or axial motion within the mounting holes. Power axle 32 projects past stop plate 34 to receive pulley 35. In order to transfer power from endless spring 36 to film roller 30, both pulley 35 and roller 30 are secured to axle 33 so that all elements are relatively non-rotatable.

The circumferential surfaces of rollers 30 and 31 are concave toward the central portion while the outer edges are cylindrical for a short distance having sprocket teeth thereon. This arrangement provides a tooth surface which will grip or contact the sprocket holes of film F as it passes through the rollers while the soft central portion of the film is suspended in non-contacting relation between the roller surfaces. Such an arrangement allows the film to be fed into the magazine without scratching the film surface or otherwise marring or destroying the quality of the picture. The spring means 36 is driven by a motor M to rotate the pulley 35 and roller in a counterclockwise direction, as viewed from the front, to pull film F down into the magazine chamber with constant relatively low torque force.

A second constant torque drive means $T_2$ is positioned at the lower corner of the film magazine C and is of the same construction as torque means $T_1$. Another pulley drive means 38 and spring 39 are provided which will apply a constant torque to one of the upper film rollers in the clockwise direction to pull film F back in toward the lower outlet opening in much the same manner as described for constant torque device $T_1$.

In passing film F through magazine C, the upper and lower constant torque devices $T_1$ and $T_2$ both pull the film toward the magazine at a relatively low force. Once inside the magazine, the film bends into a series of even folds which prevent the film from catching or snagging and provide high density storage. When film viewing is desired, the sprocket drive of projector or viewer D exerts a tensional force on film F in the direction of the arrow away from the lower outlet opening at drive means $T_2$. Since the sprocket drive means of the viewer D exerts a relatively high positive pulling force on film F while constant torque device $T_2$ exerts an opposite constant pulling moment which is lower than the force of the sprocket drive of the projector, film F is pulled out of the magazine chamber against the force exerted by the slipping pulley and spring drive means 38 and 39.

By providing this low level constant torque at both the apex and the lower output opening, film F is maintained under slight tensional forces at all times that it is outside the storage magazine C. This thus prevents the film from tangling when outside the magazine. When viewer D is reversed for purposes of reviewing a scene, the tensional force directed away from the magazine C is released and the torque force exerted by constant torque means $T_2$ then pulls the film F back into the magazine C. Thus the pull-back tension from constant torque device $T_2$ maintains the film under a tensional force during both the reversing and rewinding step of viewing the film.

As illustrated in FIG. 5, a second embodiment of this invention includes two side-by-side film magazines $C_1$ and $C_2$. Each film magazine is of similar construction to film magazine C, described in FIGS. 2 and 4, having constant torque drive means $T_1$ and $T_3$ at the upper truncated apieces. There is, however, a difference in the film roller pairs 50 and 51 at the lower corners. No drive pulley or drive axle is required. Each of these roller pairs 50 and 51 are identical and include two freely rotatable spaced apart parallel concave rollers, such as upper roller 50a and lower roller 50b, which are freely rotatable on an axle pin. The spacing between the surface of each cylindrical sprocket band at the edge of adjacent rollers is sufficient to pass the film F as it leaves the interior of the magazine $C_1$ and enters magazine $C_2$ respectively. Hinged access doors 40 and 41 are secured to the front face of each individual film magazine to provide means for inspecting or repairing the interior storage chamber. Lower inlet roller pair 51 is identical to lower outlet roller means 50 and need not be described in detail.

A film transfer spindle H is rotatably mounted about an axis of pin 52 at a point spaced from and adjacent the lower outlet and inlet roller means 50 and 51 respectively. This allows the film to be curved back toward the magazines when transferring the film from the first film magazine $C_1$ to the second film magazine $C_2$ during the storage operation.

In operation the continuous strip film F enters the opening between rollers 30 and 31 of constant torque means $T_1$, at the apex of film magazine $C_1$, leaves through the space between lower roller pair 50, is curved around film transfer spindle H, enters the film magazine $C_2$ through the space between film roller pair 51 and exits at the apex of magazine $C_2$ through the space between the rollers of constant torque means $T_3$. In transferring film F to the first magazine $C_1$, constant torque drive means $T_1$ exerts constant tensional force pulling the film toward the magazine. Once film F is inside the magazine no tensional forces are exerted and the film bends into a series of folds which permit a long length of film to be stored.

When the sprocket drive of viewer D (not shown) exerts tensional force on film F, it is pulled from magazine $C_2$ at the opening between rollers 80 and 81 of constant torque device $T_3$. If there is no slack film within magazine $C_2$, additional film has to be pulled from magazine $C_1$. The tensional force from the viewer drive is transferred along film F to pull any stored film from the first film magazine $C_1$ through the opening between film guide roller pair 50a and 50b. When it is desired to reverse film F, at viewer D, for purposes of reviewing a scene the sprocket drive of the viewer is reversed and constant torque device $T_3$ operates to pull film F back into magazine $C_2$. Once inside magazine $C_2$ the film bends into a series of folds for high density storage within the interior chamber. If viewer D is then forward driven, the sprocket drive pulls film F from magazine $C_2$ for review. Thus a continuous strip of film can be viewed in this manner. Where all stored film is completely pulled out of magazine $C_2$, additional film is pulled from the first film magazine $C_1$ transferred around the spindle H through film magazine $C_2$ and shown on the viewer.

Since the constant torque drive means $T_1$ and $T_3$ are both pulley-spring friction drive type, they slip when a given torque is exceeded. Thus at all times the film is outside of either magazine, it is maintained under a constant tensional force.

By thus feeding the film into the magazine through one of the corners of the triangular configuration it is possible to provide a high density storage of a magnitude not previously known in storage magazines. The low frictional transfer and sliding of the film within the magazine permits steady input of film without causing snagging or snarling within the magazine during the feeding. As a result, the relatively even distribution of the film F within the magazine permits greater storage than previously known.

While two embodiments of this invention have been illustrated and described above, it will be understood that other changes and modifications may be made in the details thereof without departing from the scope of the invention and is limited only by the scope of the appended claims.

What is claimed is:

1. A film storage magazine for use in a viewing system having a projector, the storage magazine comprising: a housing having a triangular inner chamber formed therein, first and second passageways formed at individual triangular corners of the inner chamber, each being adapted to pass the strip of film between the magazine exterior and the inner chamber, at least one constant torque drive means connected to feed the strip of film into the inner chamber through the first of said passageways, whereby force exerted on the strip of film from the projector is operable to pull the film from the chamber for viewing, a second constant torque drive means connected to feed strip film into the chamber at the second of said passageways whereby the strip of film is fed back into said storage magazine when any outward pulling force exerted on the film by the projector is eliminated.

2. The film storage magazine of claim 1 in which said constant torque drive means is operable to exert a relatively lower force on the film than the projector drive exerts whereby the strip of film is pulled from the chamber by the projector against the force of constant torque drive means.

3. A strip film storage system including: first and second film storage magazines mounted adjacent one another, each said magazine having a triangular chamber formed therein; first and second passageways formed through the side walls of each said magazine being adapted to pass a strip film between the magazine exterior and triangular chamber; at least one constant torque drive means rotatably mounted on each magazine for feeding the strip film into the individual chambers at each of said first passageways, the force exerted on the strip film by at least one said constant torque drive means being low enough to permit the film to be pulled from the chamber or stopped without breaking the film, whereby the strip film is fed from the first said magazine to the second said magazine by way of the individual second said passageways, wherein that portion of the film strip within the magazine chambers tends to bend into folds for high density storage.

4. The film storage magazine of claim 1 in which the triangular side walls are concave and operable to pass the strip of film within the chamber by slidably contacting the edge portion of the film.

5. The film storage system of claim 3 in which the triangular side walls of said chamber are concave and operable to slidably contact the film edges as film is transferred within the magazine chambers.

6. A film storage magazine for use in a continuous run film process system of the type including a camera, developing means connected to receive the exposed film strip from the camera, and a controllable film projector, the film storage magazine comprising: at least one housing having an inner triangular chamber formed therein, said housing having a film inlet passageway formed at a first corner of the triangular chamber and a film outlet passageway formed at a second corner of the triangular chamber, first constant torque input drive means connected to feed the film strip into the inner chamber through the inlet passageway; and second constant torque input drive means connected to feed film toward the inner chamber by way of the outlet passageway whereby when the projector is forward driven, film is pulled from the magazine against the force of the second constant torque means, wherein when the projector operation is stopped, film between the magazine and projector is held taut by the second said constant torque means and whereas the film strip is pulled back into the inner chamber by the second said constant torque means and stored when projector operation is reversed.

7. The storage magazine of claim 6 in which the chamber side walls forming the triangular legs and base are concave and adapted to contact film within the magazine only along the edges during storage and film transfer.

8. The film storage magazine of claim 6 in which one face of the housing is hingedly mounted to provide access to the inner chamber.

9. A film storage magazine for a continuous run film system including a projector, the magazine comprising: first and second housing means each having a triangular shaped inner chamber found therein, a film inlet passageway found at one corner of the individual triangular chambers and a film outlet passageway found at another corner of the individual triangular chamber, each said housing being positioned in adjacent face-to-face relationship with each of the said inlet passageways being positioned adjacent the outlet passageways of the adjacent housing, first drive means rotatably mounted on said first housing to drive a strip film into the chamber through the film inlet passageway at a constant torque force, first roller feed means rotatably mounted on said first housing adapted to feed the strip film from the inner chamber through the outlet passageway, second roller feed means rotatably mounted on said second housing for feeding the strip of film into the inner chamber of the second housing through the inlet passageway at a constant torque force, film transfer means rotatably connected for transferring the film strip from the outlet passageway of said first housing to the inlet passageway of the second housing, and second constant torque drive means rotatably mounted on said second housing being adapted to drive the film strip toward the inner chamber of the second housing at a constant torque when the projector film direction is reversed and to permit withdrawal of the film from the chamber when the projector is driven forward.

10. The film storage magazine of claim 9 in which the side walls forming the legs and base of the triangular shape are concave being adapted to contact the edges of the sliding film strip and reduce wear and friction.

11. The film storage magazine of claim 9 in which each of the said constant torque drive means includes first and second roller each axially spaced from one another and adapted to permit strip film to be received therebetween, pulley means connected to rotate one of said rollers, and spring means connected to rotate said pulley at a constant torque to drive the film in one direction while permitting film transfer in the other direction when force greater than the constant torque force is applied to the film.

References Cited by the Examiner

UNITED STATES PATENTS

| | | | |
|---|---|---|---|
| 786,683 | 4/1905 | Roever et al. | 352—126 |
| 1,296,476 | 3/1919 | Burnett | 352—126 X |
| 2,085,188 | 6/1937 | Gerlach | 95—94 |
| 2,186,637 | 1/1940 | Green | 95—94 |
| 2,945,429 | 7/1960 | Grant | 95—94 |

JOHN M. HORAN, *Primary Examiner.*